Sept. 16, 1958     E. E. FOSTER     2,852,710
BRUSH HOLDER
Filed July 18, 1955
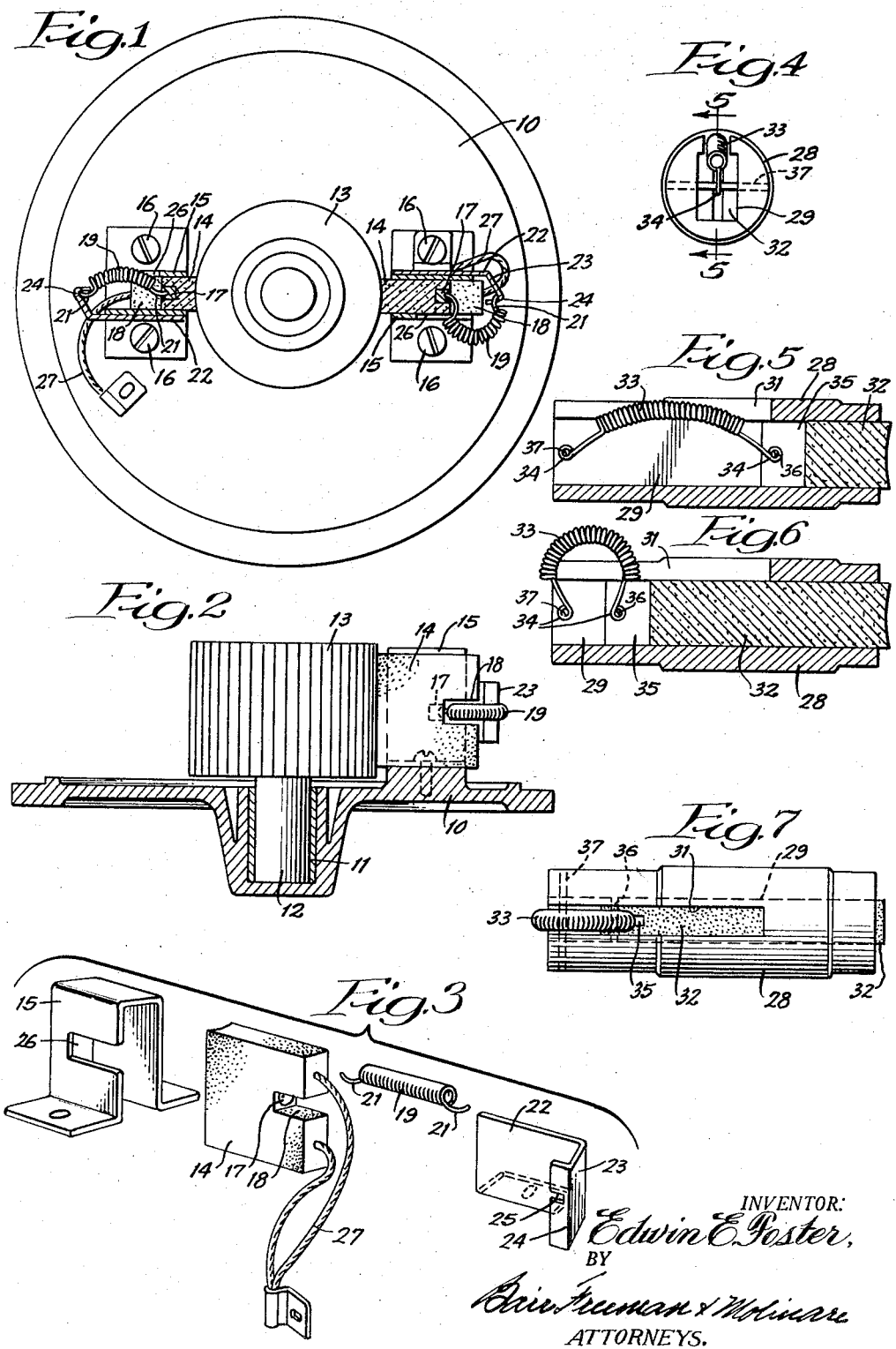
INVENTOR:
Edwin E. Foster,
BY
Bair, Freeman & McKinney
ATTORNEYS.

United States Patent Office 2,852,710
Patented Sept. 16, 1958

2,852,710

BRUSH HOLDER

Edwin E. Foster, Austin, Tex., assignor to Majik-Ironers, Inc., Austin, Tex., a corporation of Texas Application July 18, 1955, Serial No. 522,474

2 Claims. (Cl. 310—246)

This invention relates to brush holders and more particularly to holders for the brushes of electric machines such as motors, generators, rotary converters, or the like, to hold the brush in uniform contact with a rotating commutator or collector ring.

In electric machines, it is customary to employ brushes made of molded carbon or similar molded compositions held against a rotary commutator or collector ring by a spring. With conventional springs, a greater force is exerted on the brush when it is new than when the brush is worn and the spring is therefore more fully expanded. This is an undesirable characteristic, the ideal being uniform pressure on the brush regardless of the amount of wear.

It is therefore one of the objects of the present invention to provide a brush holder in which the brush is urged against a commutator or collector ring with uniform pressure regardless of the amount of wear of the brush.

Another object is to provide a brush holder in which a laterally flexed coil spring exerts a substantially constant force on the brush regardless of the degree of flexure of the spring.

Still another object is to provide a brush holder in which the spring is very simply mounted for easy insertion or removal.

According to one feature, the spring is provided with wire ends fitting pivotally in sockets or recesses in the brush and in a bracket on the holder. In one construction, the bracket on the holder is formed with an inturned flange to provide a recess for the spring end and is slotted to permit free lateral flexing of the spring. In another construction, the ends of the spring are formed into eyelets pivotally mounted on pins carried by the brush holder and the brush.

The above and other objects and features of the invention will be more readily apparent when read in connection with the accompanying drawing, in which:

Figure 1 is an end view of an electric machine equipped with brush holders embodying the invention with the brushes and brush holders shown in section;

Figure 2 is a side elevation of the construction of Figure 1;

Figure 3 is a disassembled view of the brush holder;

Figure 4 is an end view of an alternative form of brush holder;

Figures 5 and 6 are sections on the line 5—5 of Figure 4 showing the brush in different conditions of wear; and Figure 7 is a top plan view looking from the top of Figure 6.

The brush holder of the present invention is adapted to be used with an electric machine, such as a motor, generator, rotary converter, or the like, which includes an end cover plate 10 carrying a bearing 11 in which one end of an armature shaft 12 is rotatably supported. The armature shaft carries a commutator or collector ring 13 preferably lying within the motor casing to which current is adapted to flow through brushes shown generally at 14.

The brushes 14 may be in the form of rectangular blocks of conducting material, such as molded carbon or the like, which are adapted to press at one end against the commutator or collector ring 13. As shown, the brushes 14 are supported for radial movement toward the commutator or collector ring by a channel shaped member 15 flanged at its free ends and secured to the cover 10 by screws 16 to define with the cover a tubular brush holding body. The brushes 14 fit slidably in this tubular body for movement toward the commutator or collector ring.

To urge the brushes inward toward the commutator or collector ring, as shown in Figures 1 to 3, the outer end of each brush is recessed and is formed with a conical recess or socket. As shown, an insert 17 is mounted in the groove or slot 18 in the end of the brush and is provided in its outer face with a conical recess or socket.

This recess or socket in the insert 17 is adapted to receive one end of a compression spring unit for free pivotal movement therebetween. The spring unit, as shown, comprises a helical coil of spring wire 19 with the coils formed under initial axial tension to provide a constant compression or controlled compression effect, as more particularly described and claimed in my patent, Reissue 23,974. The ends of the wire extend outward from the coil, as shown at 21, and one end may be inserted in the recess or socket in the insert 17.

To anchor the opposite end of the coil a bracket 22 is secured to the tubular body 15 and is bent inwardly, as shown at 23, to extend over the outer end of the body. At its free end, the bracket terminates in an inwardly turned flange 24 which cooperates with the portion 23 of the bracket to define a recess or socket to receive the opposite end 21 of the spring. The flange 24 is provided with an elongated slot 25 through which the end of the spring may extend so that the spring can flex laterally and the body 15 may be formed with a similar slot 26 through which the spring can extend.

To install the brush, it is inserted in the body 15 with one end pressing against the commutator or collector ring. The spring is then flexed laterally, as shown at the right in Figure 1, with one end inserted in the socket in the insert 17 and with the other end extending through the slot 15 to engage the bracket. The spring as so flexed will exert a substantially constant force on the brush to urge it against the commutator or collector ring with a constant pressure regardless of the length or degree of wear of the brush.

Thus, as shown in Figure 1, a new brush, as illustrated at the right-hand side, will bear against the commutator or collector ring with substantially the same force as a worn brush, as shown at the left side.

When a brush is completely worn out the spring may easily be snapped out of the insert 17 and the bracket and a new brush may easily be installed, as described. All that remains to be done is to connect a pigtail, as shown at 27, on the brush to the desired circuit and the machine is ready for operation.

In the embodiment shown in Figures 4 to 7, the holder comprises a tubular body 28 having a rectangular bore 29 therethrough and formed with an elongated slot 31 at one side. A brush 32 of the same section as the bore 29 is inserted slidably therein to be urged to the right, as seen in Figures 5 to 7, into engagement with a commutator or collector ring.

The brush is urged by a laterally flexed coil spring 33 similar to the spring 19 of Figures 1 to 3, except that the ends thereof are formed into eyelets 34. The rear end of the brush 32 is slotted, as shown at 35, and drilled to receive a small pin 36, as best seen in Figure 7, to connect the adjacent end of the spring pivotally to the brush. The opposite end of the spring pivotally receives a pin 37 extending through the rear end of the holder.

When the brush is new, the spring 33 will be laterally flexed through the slot 31, as shown in Figures 6 and 7, and as the brush wears the spring will extend to the position shown in Figure 5. However, in all positions the spring will exert a substantially constant force on the brush urging it into engagement with the commutator or collector ring with a constant pressure. When the brush is completely worn, the parts will occupy approximately the position shown in Figure 5. To replace the brush, the pin 37 may be pressed out, the worn brush removed and the pin 36 pressed out to release the spring. The spring may then be reconnected to a new brush and after the brush has been inserted in the housing the pin 37 may be reinserted to complete the assembly.

While two embodiments of the invention have been shown and described herein, it will be understood that they are illustrative only and not to be taken as a definition of the scope of the invention, reference being had for this purpose to the appended claims.

What is claimed is:

1. A brush holder for electrical machines comprising a tubular body, a brush fitting slidably in the body to project from one end thereof, an elongated coil of spring wire having the wire projecting beyond the ends of the coiled body portion, the brush being formed in its end with a shallow wide angle recess into which one of the projecting wire ends fits loosely for pivotal movement, and a bracket secured to the body and overlying the other end thereof and providing a shallow wide angle recess into which the other projecting wire end fits loosely for pivotal movement, the spring being laterally bent between its ends resiliently to urge the brush out of said one end of the body.

2. A brush holder for electrical machines comprising a tubular body, a brush fitting slidably in the body to project from one end thereof, an elongated coil of spring wire having the wire projecting beyond the ends of the coiled body portions, the brush being formed in its end with a recess into which one of the projecting wire ends fits for pivotal movement, and a bracket secured to the body and overlying the other end thereof, and having an edge flange extending toward the body to define a recess into which the other projecting wire end fits for pivotal movement, the spring being laterally bent between its ends and the edge flange being formed with a slot through which said other projecting wire end extends.

References Cited in the file of this patent

UNITED STATES PATENTS

| | | |
|---|---|---|
| 437,946 | Sweet | Oct. 7, 1890 |
| 505,665 | Lundell | Sept. 26, 1893 |
| 777,709 | Woehr | Dec. 20, 1904 |
| 2,275,613 | Culin | Mar. 10, 1942 |
| 2,630,316 | Foster | Mar. 3, 1953 |

FOREIGN PATENTS

| | | |
|---|---|---|
| 540,267 | Germany | Dec. 9, 1931 |